J. CORWIN.
VEHICLE TIRE.
APPLICATION FILED JAN. 21, 1907.

981,618.

Patented Jan. 17, 1911.

2 SHEETS—SHEET 1.

Witnesses
Harry R. Levlute
Ray White

Inventor:
John Corwin
By W. W. Withenbury
Atty.

J. CORWIN.
VEHICLE TIRE.
APPLICATION FILED JAN. 21, 1907.
981,618.
Patented Jan. 17, 1911.
2 SHEETS—SHEET 2.
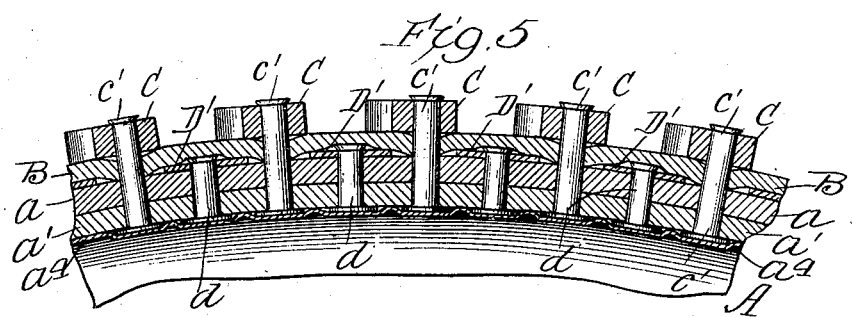
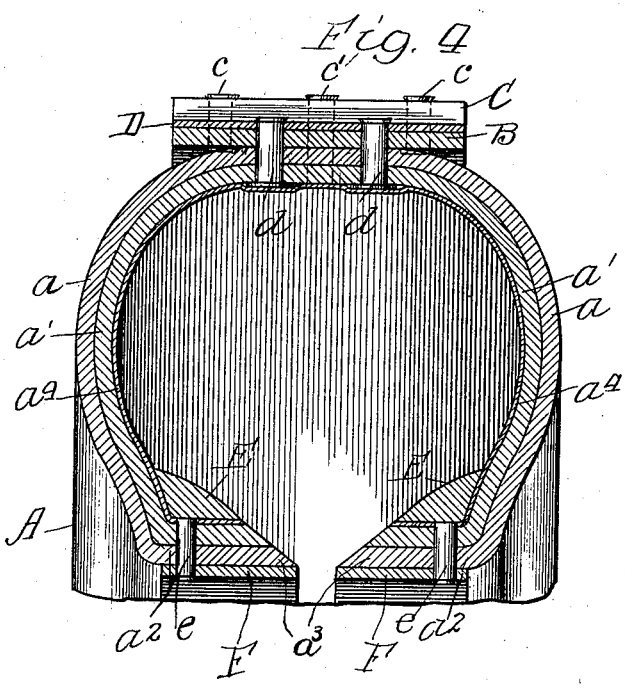
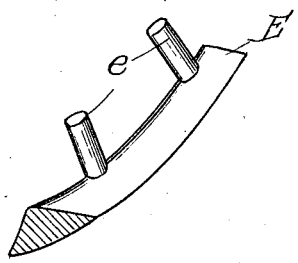
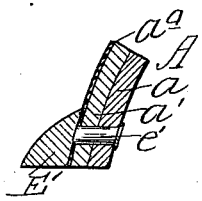
Witnesses
Harry R. L. White
Ray White
Inventor
John Corwin
W. W. Withenbury
Atty.

UNITED STATES PATENT OFFICE.

JOHN CORWIN, OF CHICAGO, ILLINOIS.

VEHICLE-TIRE.

981,618.　　　　Specification of Letters Patent.　　Patented Jan. 17, 1911.

Application filed January 21, 1907. Serial No. 353,212.

*To all whom it may concern:*

Be it known that I, JOHN CORWIN, a citizen of the United States, and residing at Chicago, in the county of Cook and State of Illinois, have invented a new and useful Improvement in Vehicle-Tires, of which the following is a complete specification.

This invention relates to vehicle tires and more particularly to the outer tube or casing for a pneumatic tire for automobiles and the like.

Heretofore pneumatic vehicle tires have usually been constructed of rubber and owing to the fact that the rubber does not offer great resistance to wear they have usually been comparatively short lived. Furthermore such tires have been more or less objectionable because of their liability to puncture at the tread surface as they become worn.

The object of this invention is to provide a pneumatic vehicle tire having a metal shod tread, which renders it puncture proof and at the same time provides an anti-skidding device by means of which the tire is enabled to take a firm hold of the road bed.

It is also an object of the invention to provide a tire which is very strong and durable and is of comparatively light weight and cheap construction, and which, while having a continuous metallic tread, possesses great resiliency.

The invention consists of the matters hereinafter described and more fully pointed out and defined in the appended claims.

Figure 1:
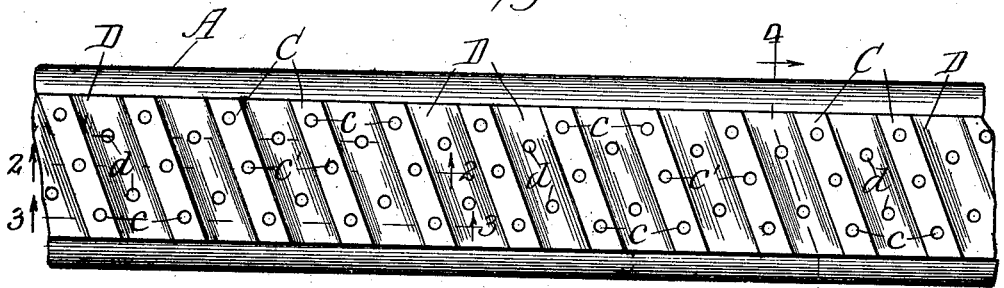
Figure 2:
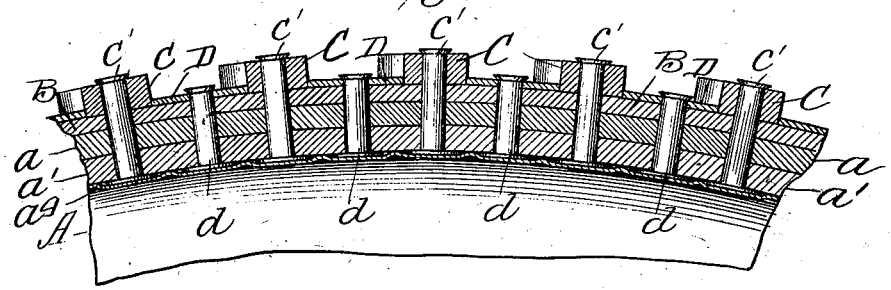
Figure 3:
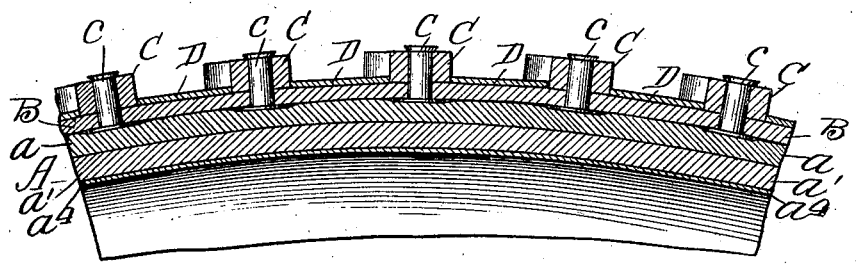
Figure 7:
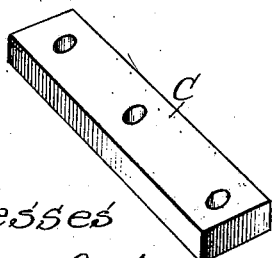
Figure 8:
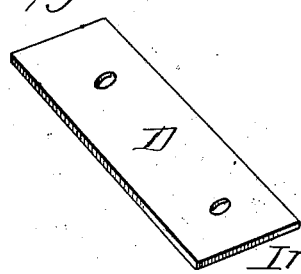

In the drawings: Figure 1 is a fragmentary top plan view of a tire embodying my invention. Fig. 2 is an enlarged section taken on line 2—2 of Fig. 1. Fig. 3 is an enlarged section taken on line 3—3 of Fig. 1. Fig. 4 is an enlarged section taken on line 4—4 of Fig. 1. Fig. 5 is a view similar to Fig. 2 but showing a slight modification of the tread. Fig. 6 is a fragmentary perspective view of one of the retaining bands. Fig. 7 is a perspective view of one of the traction lugs. Fig. 8 is a perspective view of one of the protecting plates. Fig. 9 is a fragmentary, transverse section of a tire showing a modification of the inner edges of the casing and the retaining band therefor.

As shown in said drawings: A represents the tire body or casing which as shown is open on its inner circumference and is constructed of two layers of leather $a$ and $a'$ which are firmly cemented together and pressed or formed into the desired shape and treated with any suitable dressing, such as belt dressing, capable of rendering the leather impervious to water.

Extending around the outer periphery of the casing is a tread strip B of leather or other suitable material which is of a width to fully cover the wearing or tread surface of the tire and the lateral edges of which as shown in Fig. 4 are out of contact with the casing. Arranged at equal distances apart on said tread strip are the metallic traction lugs C which may be of any desired thickness and as shown extend diagonally across the tread, though obviously they may be at right angles thereto if desired. Said lugs are each secured in place by rivets $c$—$c$ near each end thereof which pass therethrough and through the tread strip B, as shown more clearly in Figs. 3 and 4, and by a rivet $c'$ which extends through the lug and strip and also through the casing, as shown in Figs. 2 and 4. Intermediate said lugs are relatively thin, metallic protecting plates D, which fit closely between said lugs and form therewith a continuous, though jointed, metallic tread which not only renders the tire puncture proof but affords a very efficient anti-skidding device. Said plates are each secured to the casing by means of rivets $d$—$d$ spaced centrally between the rivets $c$ and $c'$ and which extend through said plates, strip and casing. All of said rivets are swaged over on their outer ends and on their inner ends are provided with relatively flat heads. If preferred the protecting plates D' may be placed beneath the tread strip, intermediate the lugs C, as shown in Fig. 5. As shown more clearly in Fig. 4 the edges $a^2$ of said casing are turned inwardly to lie flat on the wheel rim, not shown, and are beveled on their inner surfaces to provide relatively thin flaps $a^3$.

A lining $a^4$ of canvas or other preferred material is firmly cemented to the inner surface of the casing and inasmuch as it covers the heads of the rivets which extend through the casing it protects the inner tube from such heat as may be conducted into the tire by the rivets.

Fitting closely in the angle formed on the inner surface of the casing by the inturned edges $a^2$ are the retaining rings or bands E which are rigidly engaged to said edges by riveting or in any other preferred manner. Said bands may be flat bands of metal if desired but as shown they are approximately triangular in cross section and the inner surfaces thereof are in alinement with the beveled surfaces of said edges. Said bands may be provided with rivets which extend therethrough and through the edges $a^2$ but, as shown, the rivets $e$ are formed integrally with the bands and project from their inner circumferences. If preferred, and as shown, each of said edges $a^2$ may be provided on its outer surface with a packing strip F of rubber or other preferred material which is forced into close contact with the wheel rim by the pressure on said flaps $a^3$ and prevents moisture from entering the tire. Also if preferred, and as shown in Fig. 9 the edges of the casing may terminate at the wheel rim instead of turning inwardly, in which case the retaining band E' is provided with laterally projecting rivets $e'$ which extend through the margin of the casing.

The operation is as follows: The traction lugs C afford a powerful gripping surface for the tire and prevent the wheels from slipping when power is applied, and inasmuch as said lugs are arranged diagonally they prevent the tire skidding when the course deviates from a straight line. Inasmuch as the protecting plates D fit closely between said lugs, the entire tread surface of the tire is fully protected against puncturing, while at the same time said plates and lugs do not in any way interfere with the resiliency of the tire. The tread thus built up extends a sufficient distance from each side of the medial line of the tire to prevent any object puncturing the tire at its sides. The retaining bands firmly hold the edges of the casing in contact with the wheel rim and thereby prevent the casing from blowing out when the inner tube is inflated.

While I have shown the casing as constructed of a double thickness of leather it is obvious that for light tires it may be constructed of one thickness only without departing from the principles of my invention.

I claim as my invention:

1. In a device of the class described the combination with a flexible casing of transversely arranged, metallic lugs rigidly engaged thereon and protecting plates intermediate said lugs and of less thickness than the same, said lugs and plates being flat and having their ends projecting laterally out of contact with the casing.

2. In a device of the class described the combination with a leather casing open on its inner circumference, of a continuous tread strip riveted to its outer circumference and having its edges out of contact with the casing, alternately disposed thick and thin metallic members rigidly secured transversely of said strip and in close contact with each other and retaining bands engaged on the inturned edges of the casing.

3. In a device of the class described the combination with a leather casing open on its inner circumference and having inturned edges, of a tread strip rigidly engaged on its outer circumference, metallic traction lugs engaged adjacent their ends to the margins of said strip and at their centers engaged to the strip and casing, protecting plates rigidly engaged intermediate said lugs and in close contact therewith, and a retaining band rigidly engaged on the inner side of each of said edges.

4. In a vehicle tire the combination with a casing open at its inner circumference, of a tread strip extending around the same, alternately arranged thick and thin metallic plates covering said tread strip and riveted thereto and to the casing, an inner lining of fabric and retaining bands riveted to the edges of said casing.

5. In a device of the class described the combination with a tire casing open on its inner circumference and having inturned edges, a continuous tread strip rigidly engaged on its outer circumference, alternately disposed, thick and thin metallic members arranged diagonally on said strip and rigidly secured thereto in close contact with each other, an inner lining of fabric in said casing and retaining bands rigidly engaged to the inturned edges of said casing.

6. In a device of the class described the combination with a leather casing open at its inner circumference, of a continuous tread strip on the outer circumference thereof, diagonally arranged traction lugs riveted adjacent their ends to said strip and at their centers to said strip and casing, protecting plates fitting closely between said lugs and riveted through the strip and casing at points intermediate the end and central rivets in said lugs and retaining bands riveted to the inner side of the edges of said casing.

7. In a device of the class described the combination with a casing of a continuous tread strip engaged thereon and having its edges projecting free therefrom, and alternately arranged thick and thin plates engaged edge to edge on said strip and terminating at the margins thereof.

In testimony whereof I have hereunto affixed my signature in the presence of two witnesses.

JOHN CORWIN.

Witnesses:
W. W. WITHENBURY,
R. B. FULLER.